US010963224B2

(12) United States Patent
Huang et al.

(10) Patent No.: US 10,963,224 B2
(45) Date of Patent: Mar. 30, 2021

(54) GRAPHICAL PROGRAMMING CONTROL AND STORAGE SYSTEM

(71) Applicant: SOUTH CHINA UNIVERSITY OF TECHNOLOGY, Guangdong (CN)

(72) Inventors: Han Huang, Guangdong (CN); Hu Wang, Guangdong (CN); Yihui Liang, Guangdong (CN); Yichen Sheng, Guangdong (CN); Zhifeng Hao, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 42 days.

(21) Appl. No.: 16/341,925

(22) PCT Filed: Oct. 26, 2017

(86) PCT No.: PCT/CN2017/107726
§ 371 (c)(1),
(2) Date: Apr. 15, 2019

(87) PCT Pub. No.: WO2018/099214
PCT Pub. Date: Jun. 7, 2018

(65) Prior Publication Data
US 2019/0243616 A1    Aug. 8, 2019

(30) Foreign Application Priority Data
Nov. 30, 2016    (CN) .......................... 201611092887.7

(51) Int. Cl.
*G06F 9/44*    (2018.01)
*G06F 8/34*    (2018.01)
*G06F 16/22*    (2019.01)
(52) U.S. Cl.
CPC ............ *G06F 8/34* (2013.01); *G06F 16/2246* (2019.01)

(58) Field of Classification Search
None
See application file for complete search history.

(56) References Cited

U.S. PATENT DOCUMENTS

2008/0270920 A1* 10/2008 Hudson .................... G06F 8/34
715/763
2011/0004565 A1    1/2011 Stephenson et al.
(Continued)

FOREIGN PATENT DOCUMENTS

| CN | 102542592 | 7/2012 |
| CN | 103197929 | 7/2013 |

(Continued)

OTHER PUBLICATIONS

"International Search Report (Form PCT/ISA/210)", dated Jan. 25, 2018, with English translation thereof, pp. 1-4.

*Primary Examiner* — Insun Kang
(74) *Attorney, Agent, or Firm* — JCIPRNET

(57) ABSTRACT

The present invention discloses a graphical programming control and storage system, which includes a central control module, a display module connected to the central control module, a message response module, a graphical programming inter-component operating module, a graphical programming intra-component operating module, an item attribute and control module, a user-defined component module, an item persistence module, and a compilation module; and the central control module is responsible for processing, storing, and returning a delivered information and result. The system enables a user to complete complex programming by dragging the graphical programming components, and finally generates a formulated language or executable program, thus implementing graphical programming. The present invention can implement graphical programming control and storage by the solution above, enabling visible (Continued)

and intuitive programming, and improving the working efficiency of programmers.

11 Claims, 3 Drawing Sheets

(56) References Cited

U.S. PATENT DOCUMENTS

| | | | | |
|---|---|---|---|---|
| 2011/0088012 A1* | 4/2011 | Huin | ............ | G06F 8/34 717/109 |
| 2012/0030650 A1* | 2/2012 | Ravindran | ............ | G06F 8/20 717/107 |
| 2012/0227028 A1* | 9/2012 | Pun | ............ | G06F 8/38 717/108 |
| 2012/0253479 A1* | 10/2012 | Radl | ............ | G06F 8/34 700/12 |
| 2013/0332864 A1* | 12/2013 | Correll | ............ | G06F 3/0484 715/763 |
| 2015/0220311 A1* | 8/2015 | Salter | ............ | G06F 8/34 717/105 |
| 2015/0355904 A1* | 12/2015 | Koreki | ............ | G06F 8/33 717/123 |
| 2016/0077811 A1* | 3/2016 | Kodosky | ............ | G06F 8/34 717/108 |
| 2016/0092178 A1* | 3/2016 | Geng | ............ | G06F 8/34 717/104 |
| 2016/0291944 A1* | 10/2016 | Jefferson | ............ | G06F 3/04847 |
| 2016/0350080 A1* | 12/2016 | Ravindran | ............ | G06F 8/20 |
| 2017/0060541 A1* | 3/2017 | Saleh | ............ | G06F 3/04842 |
| 2017/0357488 A1* | 12/2017 | Aftab | ............ | G06F 8/38 |
| 2018/0052664 A1* | 2/2018 | Zhang | ............ | G06F 16/90332 |
| 2018/0225097 A1* | 8/2018 | Laethem | ............ | G06F 8/34 |
| 2019/0227776 A1* | 7/2019 | Palshikar | ............ | H04W 4/026 |
| 2020/0034416 A1* | 1/2020 | Hvezda | ............ | H04N 5/23203 |

FOREIGN PATENT DOCUMENTS

| | | |
|---|---|---|
| CN | 105511860 | 4/2016 |
| CN | 105955731 | 9/2016 |
| CN | 106775683 | 5/2017 |

* cited by examiner

GRAPHICAL PROGRAMMING CONTROL AND STORAGE SYSTEM

CROSS-REFERENCE TO RELATED APPLICATION

This is a 371 application of the International PCT application serial no. PCT/CN2017/107726, filed on Oct. 26, 2017, which claims priority to and the benefit of China Patent Application No. CN201611092887.7, filed on Nov. 30, 2016. The entirety of each of the above-mentioned patent applications is hereby incorporated by reference herein and made a part of this specification.

TECHNICAL FIELD

The present invention generally relates to the field of graphical programming, and more particularly, relates to a graphical programming control and storage system.

BACKGROUND

With the rapid development of computer technologies, software and hardware programming is no longer a full-time job for an IT staff Meanwhile, in the early computer education for children, programming ideas also gives further demands to reduce the difficulty of using programming language. In Jobs' lost video, he said that everyone should learn how to program, because programming can stimulate the brain and make people think more thoroughly. However, in fact, due to the complexity of program logic and the variety of programming language syntax, it is still difficult for people in non-computer related major to reach. For robot enthusiasts in non-computer hardware and software related major, as a special group among computer users, if software is programmed in a fixed chip, a certain creation space cannot be given to them, which will no longer meet their needs. The only way to solve this urgent problem is to develop a programmable platform to create your own works, which should be easy to use as well.

The existing graphical programming software is not common, and most forms are fixed. The components for programming are limited and too difficult to learn. The user still needs to spend a lot of time to understand how to use the graphical programming system. Moreover, the efficiency of the system is not sufficient, which is very time-consuming.

SUMMARY OF THE INVENTION

Aiming at the defects of the existing graphical programming systems, the present invention provides a graphical programming control and storage system. An objective of the present invention lies on providing an efficient and practical graphical programming control and storage system with simple operations, which enables users to complete complex programming tasks by only dragging and dropping graphical programming components, and the system will automatically generate corresponding logical code in other programing language or an executable program.

A graphical programming control and storage system includes a central control module, a display module connected to the central control module, a message response module, a graphical programming inter-component operating module, a graphical programming intra-component operating module, an item attribute and control module, a user-defined component module, an item persistence module, and a compilation module; the central control module is in a central position of the whole system and is responsible for processing, storing information from other modules, and returning results; the display module is used for visually displaying a graphical programming component, receiving an operation from a user, transmitting an operation message to the message response module, and displaying a result; the message response module is responsible for distributing a message to the central control module for processing information and returning a message to a message source; the graphical programming inter-component operating module is mainly responsible for controlling and storing a relationship and information between different graphical programming components; the graphical programming intra-component operating module is used for reading, modifying and storing internal parameters and other information of the programming component; the item attribute and control module is used for creating and destroying an item, and reading, modifying and storing an item attribute; the user-defined component module is responsible for creating a user-defined function or a graphical programming component on the existing graphical programming component; the item persistence module is used for serializing item information to a disk or reading out existing information; and the compilation module is used for compiling a user-compiled graphical code into other language or executable program to generate final results.

Further, the graphical programming component includes a peripheral control component (such as a sensor component completing a simple function), a circulation component for constants, variables and completion of logical functions, a selection branch component, and a user-defined component capable of completing a creation of a user-defined function or a composite function graphical programming component.

Further, the central control module and the display module are connected by the message response module, the message response module distributes the message to the central control module, the central control module processes the message and transmits a result to the message response module, and then the message response module returns the message to the message source.

Further, the central control module includes an item set, each item includes all program sets, user-defined sets and variable sets in the item; each program includes all component tree sets describing a relationship between the components, component entity sets describing an internal information of the components, and parameter connection sets describing a parameter assignment between the components in the program.

Further, the component tree set describing the relationship between the components is stored separately from the component entity set describing the internal information of the components, but logically, each group inside each program is uniquely identified by a serial number that auto-increments from 1 and corresponds to one by one; an index from tree to component is provided in each program, and a reverse index from component to tree is provided to improve a query speed; and the tree number is the root number of the tree.

Further, the circulation component contains circulation conditions, circulation times and component tree numbers in the circulation component, i.e., a root number set of the tree, meanwhile, a reverse index for numbers of tree to circulation component is provided to improve the query speed, and the circulation component can be nested by the circulation component, the selection branch component or the user-defined component; the selection branch component includes branch conditions and a plurality of selection branches, each branch includes a component tree number set in the selection branch component, and meanwhile, the reverse index for numbers of tree to circulation component is provided to improve the query speed, and the selection branch component can be nested by the circulation component, the selection branch component or the user-defined component.

Further, the circulation component has and only has one active tree that finally participates in compilation, and a number calculation method of the tree is $I=ID_{module}*ACTIVE\_TREE\_MAP\_FACTOR$, wherein I is an active tree number, $ID_{module}$ is a module number, and ACTIVE_TREE_MAP_FACTOR is set to 100000; similarly, in each branch of the selection branch component only has one active tree that finally participates in compilation, and a number calculation method of the tree is $I=ID_{module}*ACTIVE\_TREE\_MAP\_FACTOR+ID_{module}$, wherein I is an active tree number, $ID_{module}$ is a module number, ACTIVE_TREE_MAP_FACTOR is set to 100000, and $ID_{module}$ is a branch number.

Further, the user-defined component module can combine a plurality of existing programming components into a new programming component, including all component tree sets describing a relationship between the components, component entity sets describing an internal information of the components, and parameter connection sets describing a parameter assignment relationship between the components in the user-defined component; and the user-defined component can be nested by the circulation component, the selection branch component or the user-defined component.

Further, the graphical programming inter-component operating module includes an inserting operation, a searching operation, a moving operation and a deleting operation of a module.

The inserting operation includes following steps.

(a) Initiating, by the user, an instruction of inserting a new component.

(b) Receiving, by the message response module, a message of (a), finding a central control module function responsible for the inserting operation, and judging whether an inserting type is post-insertion or pre-insertion; if the inserting type is post-insertion, passing a precursor module number of a component to be inserted into the central control module function; otherwise, passing a successor module number of the component to be inserted into a central controller function.

(c) Adding, by the central control module, 1 to a maximum component number in the corresponding program as a number of the new component to be inserted.

(d) If the inserting type is post-insertion, judging whether the number of a precursor node is 0, if the number of the precursor node is 0, generating a new tree, and using a newly inserted node as a root of the tree; if the number of the precursor node is not 0 and a node exists behind the precursor node, disconnecting the rear node first, inserting the new node behind the precursor node, and then connecting the original rear node behind the new node; if the number of the precursor node is not 0 and no node exists behind the precursor node, directly connecting the new node behind the precursor node; if the inserting type is pre-insertion, judging whether the successor node is 0, if the successor node is 0, generating a new tree and using the newly inserted node as a root of the tree; judging whether the successor node is the root of the tree, if yes, replacing the newly inserted node by the root of the tree, and updating a mapping index from component to tree; otherwise, forbidding the pre-insertion; if the insertion into the circulation component and the selection branch component completing a logical function is needed, further updating a mapping index from tree to logical function component.

(e) Finding initialization information of the component in a component initialization sub-module of the persistence module, and initializing the internal information of the module.

(f) Feeding back a result by the message response module.

The moving operation includes the following steps.

(g) Initiating, by the user, an instruction of moving a component.

(h) Receiving, by the message response module, a message of (g), finding the central controller function responsible for the moving operation, and judging whether a moving type is single-component post-movement, single-component pre-movement, multi-component post-movement, or multi-component pre-movement; if the moving type is single-component post-movement, passing a number of a component to be moved and a number of a precursor component at a position to be inserted into the central controller function; if the moving type is single-component pre-movement, passing the number of the component to be moved and the number of the successor component at the position to be inserted into the central controller function; if the moving type is multi-component post-movement, passing all the numbers of components to be moved and the numbers of precursor components at the position to be inserted into the central controller function; and if the moving type is multi-component pre-movement, passing all the numbers of components to be moved and the numbers of successor components at the position to be inserted into the central controller function.

(i) If the moving type is single-component movement, disconnecting the existing connection of the component node to be moved, and if the node to be moved has a successor node, directly connecting the successor node to a precursor node of a deleted node; if the moving type is multi-component movement, disconnecting all the selected component nodes that are not connected to the line from the precursor node, and if a connected domain of the node to be moved has no bifurcation and the successor node exists, directly disconnecting the successor node from the precursor node of the deleted node; and if the connected domain of the node to be moved is bifurcated and the successor node exists, directly disconnecting the successor node from the precursor node, and generating a new tree by these successor nodes.

(j) If the moving type is single-component movement and post-movement, judging whether the number of the precursor node is 0, if the number of the precursor node is 0, generating a new tree and using a newly moved node as a root of the tree; if the number of the precursor node is not 0 and a node exists behind the precursor node, disconnecting the rear node first, moving the new node behind the precursor node, and then connecting the original rear node behind the new node; if the number of the precursor node is not 0 and no node exists behind the precursor node, directly connecting the new node behind the precursor node; if the moving type is pre-movement, judging whether the successor node is 0, if the successor node is 0, generating a new tree and using the newly moved node as a root of the tree; judging whether the successor node is the root of the tree, if so, replacing the newly moved node by the root of the tree, and updating the mapping index from component to tree; otherwise, forbidding the pre-insertion; if movement to the circulation component and the selection branch component completing the logical function is needed, further updating the mapping index from tree to logical function component;

if the moving type is multi-component movement, moving the component of the same connected domain selected by a mouse only; judging whether the component in the connected domain has a bifurcation, if not, using the whole connected domain as one component, with the same moving mode as the single-module movement; and if the component in the connected domain has the bifurcation, moving back at the leaf node of the existing tree only, otherwise the movement being failed.

(k) Feeding back a result by the message response module.

The deleting operation includes following steps.

(l) Initiating, by the user, an instruction of deleting a component.

(m) Receiving, by the message response module, a message of (l), finding the central controller function responsible for deleting operation, and passing a number of a component to be deleted into the central controller function.

(n) Disconnecting the existing connection of the component node to be deleted and deleting the node, if the node to be deleted has a successor node, directly connecting the successor node to a precursor node of the deleted node.

(o) Deleting the internal information of the component, if the circulation component and the selection branch component completing the logical function are deleted, further deleting all tree nodes in the component, and corresponding component information and nested logical component, and updating the mapping index.

(p) Feeding back a result by the message response module.

Further, the persistence module includes a component initialization sub-module and a user information sub-module; the component initialization sub-module includes initialization information inside all the components; the user information sub-module is responsible for reading and compiling inter-component information and intra-component information saved by the user; and dynamic expansion of the graphical programming component is realized by only needing to compile an initialization information persistence document of the newly added component and adding the initialization information persistence document to the component initialization sub-module without recompiling the item.

Compared with the prior art, the present invention has following advantages and technical effects.

Most of the existing graphical programming systems are modified on the same graphical open-source framework, there is not much innovation in either the graphical interface or the implementation, and the components that can be provided to the user for programming are limited and too professional with high learning cost. Moreover, the efficiency of the system itself is not high, with poor effect. The graphical programming software is scarcer in China. In view of the problem above, the present invention allows the user to realize complex programming operation by simple operation and allows the user to concentrate on realizing their programming ideas. In addition, the system has considerable expansibility, which not only can dynamically expand the graphical programming component, but also can be combined with a hardware peripheral or a robot to complete the operation of software or hardware by dragging an icon on an interface. Moreover, the system has a clear structure, is simple and efficient and can be used as a control and storage core of many graphical programming software, thereby enabling the user to use the graphical programming software more easily and efficiently.

DETAILED DESCRIPTION OF THE PREFERRED EMBODIMENT

The implementations of the present invention are further described below with reference to the accompanying drawings, but the implementation of the present invention is not limited thereto. It should be noted that if there are following processes specifically described in detail below, they can be realized by those skilled in the art by referring to the prior art.

Figure 1:
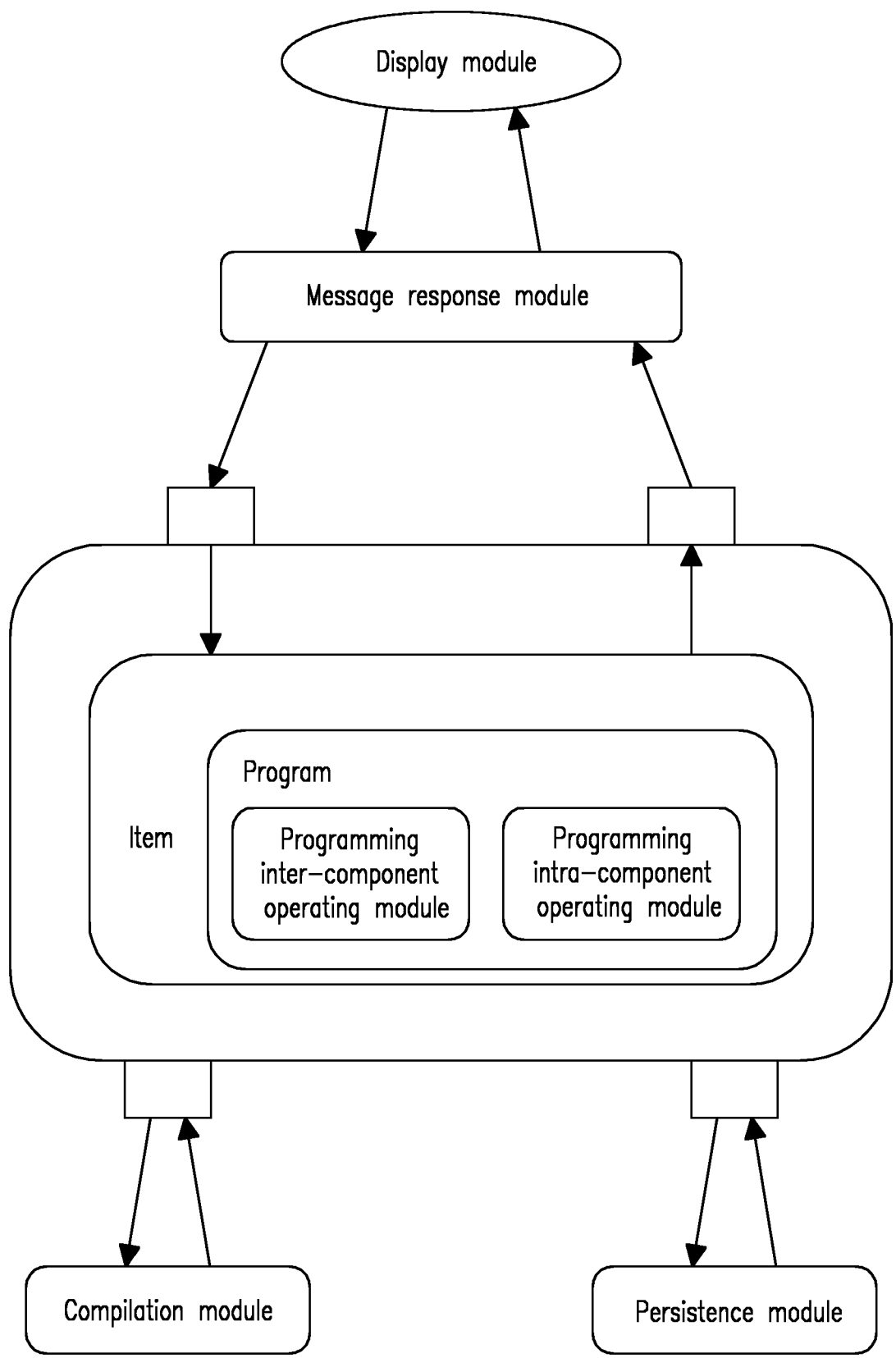
FIG. 1 is a system composition diagram of a graphical programming control and storage system according to an implementation.
Figure 2:
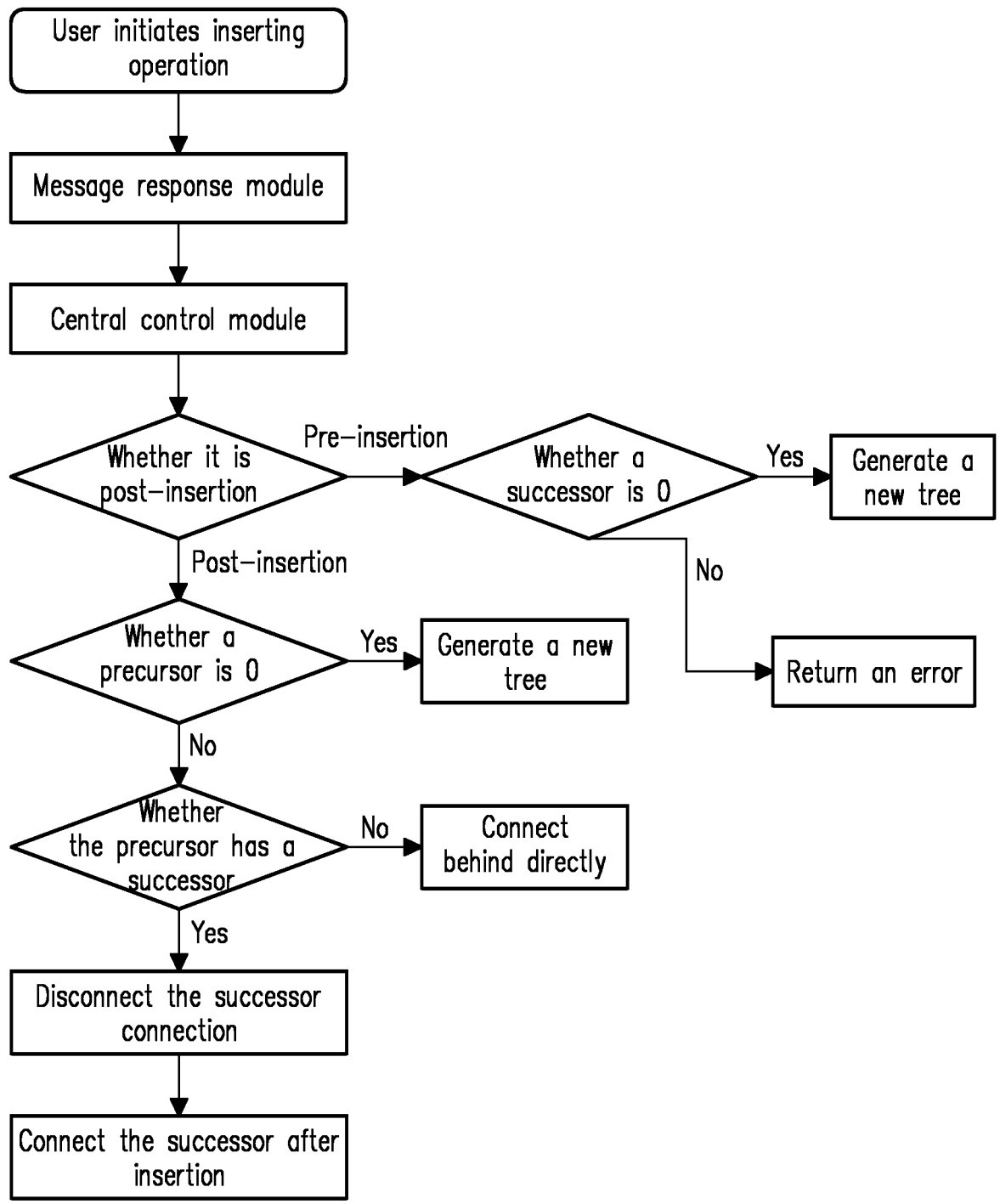
FIG. 2 is a flow chart illustrating an inserting operation of the graphical programming control and storage system according to an implementation.
Figure 3:
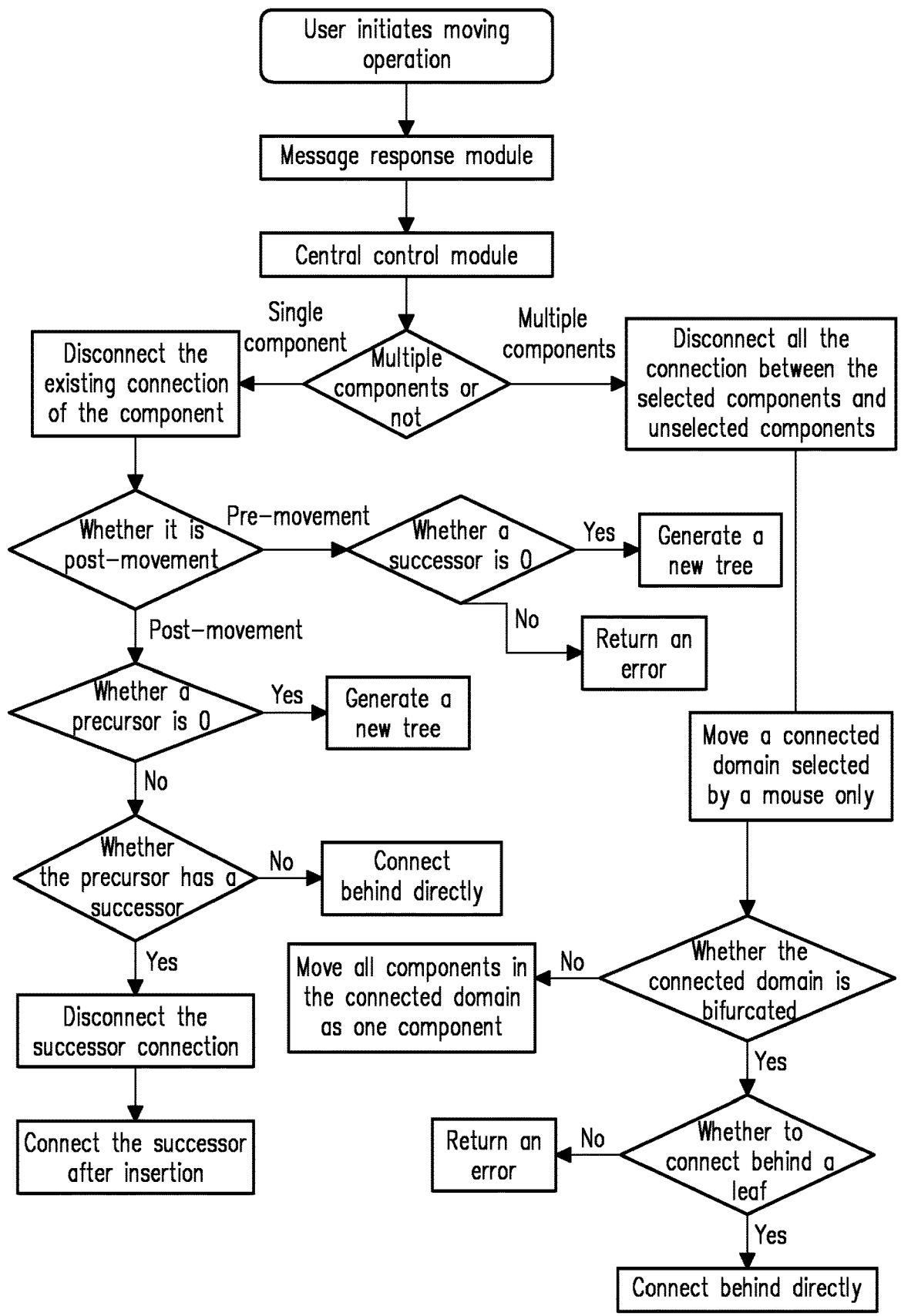
FIG. 3 is a flow chart illustrating a moving operation of the graphical programming control and storage system according to an implementation.

As shown in FIG. 1, a graphical programming control and storage system includes a central control module, a display module connected to the central control module, a message response module, a graphical programming inter-component operating module, a graphical programming intra-component operating module, an item attribute and control module, a user-defined component module, an item persistence module, and a compilation module; the central control module is in a central position of the whole system and is responsible for processing, storing, and returning a delivered information and result; the display module is used for visually displaying a graphical programming component, receiving an operation from a user, transmitting an operation message to the message response module, and displaying a result; the message response module is used for distributing a message to a corresponding portion of the central control module for processing and returning a message processing result to a message source to complete the connection function; the graphical programming inter-component operating module is mainly responsible for controlling and storing an organization relationship and information between the graphical programming components; the graphical programming intra-component operating module is used for reading, modifying and storing internal parameters and other information of the programming component; the item attribute and control module is used for creating and destroying an item, and reading, modifying and storing an item attribute; the user-defined component module is used for re-creating a user-defined function or a graphical programming component on the existing graphical programming component; the item persistence module is used for persisting an item information to a disk and reading out an existing information; and the compilation module is used for compiling a user-compiled graphical code into other language or executable program to generate a final result.

The graphical programming component includes sensor components completing simple function, such as a peripheral control component, a circulation component for constants, variables and completion of logical functions, a selection branch component, and a user-defined component capable of completing a creation of a user-defined function or a composite function graphical programming component.

The central control module and the display module are connected by the message response module instead of direction connection, the message response module distributes the message to the central control module, the central control module processes the message and transmits a result to the message response module, and then the message response module returns the message to the message source.

The central control module includes an item set, and each item above includes all program sets, user-defined sets and variable sets in the item.

Each program includes all component tree sets describing a relationship between the components, component entity sets describing an internal information of the components, and parameter connection sets describing a parameter assignment between the components in the program.

The component tree set describing the relationship between the components is stored separately from the component entity set describing the internal information of the components, but logically, each group inside each program is uniquely identified by a serial number that auto-increments from 1 and corresponds to one by one; an index from tree to component is provided in each program, and a reverse index from component to tree is provided to improve a query speed; and the tree number is the root number of the tree.

The circulation component contains circulation conditions, circulation times and component tree numbers in the circulation component (the root number set of the tree), meanwhile, a reverse index for numbers of tree to circulation component is provided to improve the query speed, and the circulation component can be nested by the circulation component, the selection branch component or the user-defined component; the selection branch component includes branch conditions and a plurality of selection branches, each branch includes a component tree number set in the selection branch component, and meanwhile, the reverse index for numbers of tree to circulation component is provided to improve the query speed, and the selection branch component can be nested by the circulation component, the selection branch component or the user-defined component.

The circulation component has and only has one active tree that finally participates in compilation, and a number calculation method of the tree is $I=ID_{module}*ACTIVE\_TREE\_MAP\_FACTOR$, wherein I is an active tree number, $ID_{module}$ is a module number, and ACTIVE_TREE_MAP_FACTOR is set to 100000; for example, when $ID_{module}$ is 9, the active tree number $I=9*100000=900000$. In each branch of the selection branch component only has one active tree that finally participates in compilation, and a number calculation method of the tree is $I=ID_{module}*ACTIVE\_TREE\_MAP\_FACTOR+ID_{module}$, wherein I is an active tree number, $ID_{module}$ is a module number, ACTIVE_TREE_MAP_FACTOR is set to 100000, and $ID_{module}$ is a branch number; for example, when $ID_{module}$ is 9 and $ID_{module}$ is 3, the active tree number $I=9*100000+3=900003$.

The user-defined component module can combine a plurality of existing programming components into a new programming component, including all component tree sets describing a relationship between the components, component entity sets describing internal information of the components, and parameter connection sets describing a parameter assignment relationship between the components in the user-defined component; and the user-defined component can be nested by the circulation component, the selection branch component or the user-defined component.

The graphical programming inter-component operating module includes an inserting operation, a searching operation, a moving operation and a deleting operation of a module.

The inserting operation includes following steps.

(a) Initiating, by the user, an instruction of inserting a new component.

(b) Receiving, by the message response module, a message of (a), finding a central control module function responsible for the inserting operation, and judging whether an inserting type is post-insertion or pre-insertion; if the inserting type is post-insertion, passing a precursor module number of a component to be inserted into the central control module function; otherwise, passing a successor module number of the component to be inserted into a central controller function.

(c) Adding, by the central control module, 1 to a maximum component number in the corresponding program as a number of the new component to be inserted.

(d) If the inserting type is post-insertion, judging whether the number of a precursor node is 0, if the number of the precursor node is 0, generating a new tree, and using a newly inserted node as a root of the tree; if the number of the precursor node is not 0 and a node exists behind the precursor node, disconnecting the rear node first, inserting the new node behind the precursor node, and then connecting the original rear node behind the new node; if the number of the precursor node is not 0 and no node exists behind the precursor node, directly connecting the new node behind the precursor node; if the inserting type is pre-insertion, judging whether the successor node is 0, if the successor node is 0, generating a new tree and using the newly inserted node as a root of the tree; judging whether the successor node is the root of the tree, if yes, replacing the newly inserted node by the root of the tree, and updating a mapping index from component to tree; otherwise, forbidding the pre-insertion; if the insertion into the circulation component and the selection branch component completing a logical function is needed, further updating a mapping index from tree to logical function component.

(e) Finding an initialization information of the component in a component initialization sub-module of the persistence module, and initializing the internal information of the module.

(f) Feeding back a result by the message response module.

The moving operation includes following steps.

(g) Initiating, by the user, an instruction of moving a component.

(h) Receiving, by the message response module, a message of (g), finding the central controller function responsible for the moving operation, and judging whether a moving type is single-component post-movement, single-component pre-movement, multi-component post-movement, or multi-component pre-movement; if the moving type is single-component post-movement, passing a number of a component to be moved and a number of a precursor component at a position to be inserted into the central controller function; if the moving type is single-component pre-movement, passing the number of the component to be moved and the number of the successor component at the position to be inserted into the central controller function; if the moving type is multi-component post-movement, passing all the numbers of components to be moved and the numbers of precursor components at the position to be inserted into the central controller function; and if the moving type is multi-component pre-movement, passing all the numbers of components to be moved and the numbers of successor components at the position to be inserted into the central controller function.

(i) If the moving type is single-component movement, disconnecting the existing connection of the component node to be moved, and if the node to be moved has a successor node, directly connecting the successor node to a precursor node of a deleted node; if the moving type is multi-component movement, disconnecting all the selected component nodes that are not connected to the line from the precursor node, and if a connected domain of the node to be moved has no bifurcation and the successor node exists, directly disconnecting the successor node from the precursor node of the deleted node; and if the connected domain of the node to be moved is bifurcated and the successor node exists, directly disconnecting the successor node from the precursor node, and generating a new tree by these successor nodes.

(j) If the moving type is single-component movement and post-movement, judging whether the number of the precursor node is 0, if the number of the precursor node is 0, generating a new tree and using a newly moved node as a root of the tree; if the number of the precursor node is not 0 and a node exists behind the precursor node, disconnecting the rear node first, moving the new node behind the precursor node, and then connecting the original rear node behind the new node; if the number of the precursor node is not 0 and no node exists behind the precursor node, directly connecting the new node behind the precursor node; if the moving type is pre-movement, judging whether the successor node is 0, if the successor node is 0, generating a new tree and using the newly moved node as a root of the tree; judging whether the successor node is the root of the tree, if so, replacing the newly moved node by the root of the tree, and updating the mapping index from component to tree; otherwise, forbidding the pre-insertion; if movement to the circulation component and the selection branch component completing the logical function is needed, further updating the mapping index from tree to logical function component; if the moving type is multi-component movement, moving the component of the same connected domain selected by a mouse only; judging whether the component in the connected domain has a bifurcation, if not, using the whole connected domain as one component, with the same moving mode as the single-module movement; and if the component in the connected domain has the bifurcation, moving back at the leaf node of the existing tree only, otherwise the movement being failed.

(k) Feeding back a result by the message response module.

The deleting operation includes following steps.

(l) Initiating, by the user, an instruction of deleting a component.

(m) Receiving, by the message response module, a message of (l), finding the central controller function responsible for deleting operation, and passing a number of a component to be deleted into the central controller function.

(n) Disconnecting the existing connection of the component node to be deleted and deleting the node, if the node to be deleted has a successor node, directly connecting the successor node to a precursor node of the deleted node.

(o) Deleting the internal information of the component, if the circulation component and the selection branch component completing the logical function are deleted, further deleting all tree nodes in the component, and corresponding component information and nested logical component, and updating the mapping index.

(p) Feeding back a result by the message response module.

The persistence module includes a component initialization sub-module and a user information sub-module; the component initialization sub-module includes initialization information inside all the components; the user information sub-module is responsible for reading and compiling inter-component information and intra-component information saved by the user.

The dynamic expansion of the graphical programming component is realized by only needing to compile an initialization information persistence document of the newly added component and adding the initialization information persistence document to the component initialization sub-module without recompiling the item.

After that, the component is compiled by using the compilation module by the intra-component information; and the component is linked by using the compilation module by the inter-component information, and the graphical code complied by the user generates other languages or executable programs.

What is claimed:

1. A graphical programming control and storage system, comprising:
    a hardware memory and a hardware processor;
    a central control module, a display module connected to the central control module, a message response module, a graphical programming inter-component operating module, a graphical programming intra-component operating module, an item attribute and control module, a user-defined component module, an item persistence module, and a compilation module;
    wherein the hardware memory is configured to store the display module, the central control module, the message response module, the graphical programming inter-component operating module, the graphical programming intra-component operating module, the item attribute and control module, the user-defined component module, an item persistence module, and the compilation module;
    wherein the hardware processor is coupled to the hardware memory for accessing and executing the display module, the central control module, the message response module, the graphical programming inter-component operating module, the graphical programming intra-component operating module, the item attribute and control module, the user-defined component module, an item persistence module, and the compilation module;
    wherein the central control module is in a central position of the graphical programming control and storage system and processes, stores information from other modules of the graphical programming control and storage system, and returns results of the processed information to the other modules;
    the display module visually displays a graphical programming component, receives an operation from users, transmits an operation message to the message response module, and displays an image result;
    the message response module distributes a message to the central control module for processing information and returning a message to a message source;
    the graphical programming inter-component operating module controls and stores relationship and information between different graphical programming components;
    the graphical programming intra-component operating module reads, modifies and stores internal parameters and other information of the programming component;
    the item attribute and control module creates and destroys an item, and reads, modifies and stores an item attribute;

the user-defined component module creates a user-defined function or a second graphical programming component on an existing first graphical programming component;

the inter-component operating module, the intra-component operating module, the item attribute and control module, and the user-defined component module of the central control module are connected to the message response module;

the item persistence module connected to the central control module serializes an item information to a disk or reading out existing information; and the compilation module compiles a user-compiled graphical code into other language or executable program to generate a final result based on information obtained from the intra-component operating module and inter-component operating module, wherein the central control module comprises an item set, each item of the item set comprises all program sets, user-defined sets and variable sets in the item;

each program of the program sets comprises all component tree sets describing a relationship between the components, component entity sets describing an internal information of the components, and parameter connection sets describing a parameter assignment between the components in the program.

2. The graphical programming control and storage system according to claim 1, wherein the graphical programming component comprises a peripheral control component, a circulation component for constants, variables and completion of logical functions, a selection branch component, and a user-defined component capable of completing a creation of a user-defined function or a composite function graphical programming component.

3. The graphical programming control and storage system according to claim 1, wherein the central control module and the display module are connected by the message response module, the message response module distributes the message to the central control module, the central control module processes the message and transmits a result to the message response module, and then the message response module returns the message to the message source.

4. The graphical programming control and storage system according to claim 1, wherein the component tree sets describing the relationship between the components is stored separately from the component entity sets describing the internal information of the components, but logically, each group inside each program is uniquely identified by a serial number that auto-increments from 1 and corresponds to one by one; an index from tree to component is provided in each program, and a reverse index from component to tree is provided to improve a query speed; and a tree number is a root number of a tree.

5. The graphical programming control and storage system according to claim 2, wherein the circulation component contains circulation conditions, circulation times and component tree numbers in the circulation component, which is a root number set of a tree, and meanwhile, a reverse index for numbers of tree to circulation component is provided to improve a query speed, and the circulation component can be nested by the circulation component, the selection branch component or the user-defined component; the selection branch component comprises branch conditions and a plurality of selection branches, each branch comprises a component tree number set in the selection branch component, and meanwhile, the reverse index for numbers of tree to circulation component is provided to improve the query speed, and the selection branch component can be nested by the circulation component, the selection branch component or the user-defined component.

6. The graphical programming control and storage system according to claim 5, wherein the circulation component has and only has one active tree that finally participates in compilation, and a number calculation method of the tree is $I=ID_{module}*ACTIVE\_TREE\_MAP\_FACTOR$, wherein I is an active tree number, $ID_{module}$ is a module number, and ACTIVE_TREE_MAP_FACTOR is 100000; in each branch of the selection branch component, only one active tree finally participates in compilation, and a number calculation method of the tree is $I=ID_{module}*ACTIVE\_TREE\_MAP\_FACTOR+ID_{module}$, wherein I is an active tree number, $ID_{module}$ is a module number, ACTIVE_TREE_MAP_FACTOR is 100000, and $ID_{module}$ is a branch number.

7. The graphical programming control and storage system according to claim 1, wherein the user-defined component module combines a plurality of existing programming components into a new programming component, comprising all component tree sets describing a relationship between the components, component entity sets describing an internal information of the components, and parameter connection sets describing a parameter assignment relationship between the components in a user-defined component; and the user-defined component can be nested by the circulation component, a selection branch component or the user-defined component.

8. The graphical programming control and storage system according to claim 1, wherein the graphical programming inter-component operating module comprises an inserting operation, a searching operation, a moving operation and a deleting operation of a module;

wherein the inserting operation comprises following steps:
(a) initiating, by a user, an instruction of inserting a new component;
(b) receiving, by the message response module, the message of (a), finding the central control module function for the inserting operation, and judging whether an inserting type is post-insertion or pre-insertion; if the inserting type is post-insertion, passing a precursor module number of a component to be inserted into the central control module function; otherwise, passing a successor module number of the component to be inserted into a central controller function;
(c) adding, by the central control module, 1 to a maximum component number in the corresponding program as a number of the new component to be inserted;
(d) if the inserting type is post-insertion, judging whether the number of a precursor node is 0, if the number of the precursor node is 0, generating a new tree, and using a newly inserted node as a root of a tree; if the number of the precursor node is not 0 and a node exists behind the precursor node, disconnecting the rear node first, inserting the new node behind the precursor node, and then connecting the original rear node behind the new node; if the number of the precursor ode is not 0 and no node exists behind the precursor node, directly connecting the new node behind the precursor node; if the inserting type is pre-insertion, judging whether the successor node is 0, if the successor node is 0, generating a new tree and using the newly inserted node as a root of the tree; judging whether the successor node is the root of the tree, if yes, replacing the newly inserted node by the root of the tree, and updating a mapping index from component to tree; otherwise, forbidding the pre-insertion; if the insertion into the circulation component and a selection branch completing a logical function is needed, further updating a mapping index from tree to logical function component;

(e) finding initialization an information of the component in a component initialization sub-module of the persistence module, and initializing an internal information of the module; and (f) feeding back a result by the message response module;

wherein the moving operation comprises following steps:

(g) initiating, by the user, an instruction of moving a component;

(h) receiving, by the message response module, a message of (g), finding the central controller function for the moving operation, and judging whether a moving type is single-component post-movement, single-component pre-movement, multi-component post-movement, or multi-component pre-movement; if the moving type is single-component post-movement, passing a number of a component to be moved and a number of a precursor component at a position to be inserted into the central controller function; if the moving type is single-component pre-movement, passing the number of the component to be moved and the number of the successor component at the position to be inserted into the central controller function; if the moving type is multi-component post-movement, passing all the numbers of components to be moved and the numbers of precursor components at the position to be inserted into the central controller function; and if the moving type is multi-component pre-movement, passing all the numbers of components to be moved and the numbers of successor components at the position to be inserted into the central controller function;

(i) if the moving type is single-component movement, disconnecting the existing connection of the component node to be moved, and if the node to be moved has a successor node, directly connecting the successor node to a precursor node of a deleted node; if the moving type is multi-component movement, disconnecting all the selected component nodes that are not connected to the line from the precursor node, and if a connected domain of the node to be moved has no bifurcation and the successor node exists, directly disconnecting the successor node from the precursor node of the deleted node; and if the connected domain of the node to be moved is bifurcated and the successor node exists, directly disconnecting the successor node from the precursor node, and generating a new tree by these successor nodes;

(j) if the moving type is single-component movement and post-movement, judging whether the number of the precursor node is 0, if the number of the precursor node is 0, generating a new tree and using a newly moved node as a root of the tree; if the number of the precursor node is not 0 and a node exists behind the precursor node, disconnecting the rear node first, moving the new node behind the precursor node, and then connecting the original rear node behind the new node; if the number of the precursor node is not 0 and no node exists behind the precursor node, directly connecting the new node behind the precursor node; if the moving type is pre-movement, judging whether the successor node is 0, if the successor node is 0, generating a new tree and using the newly moved node as a root of the tree; judging whether the successor node is the root of the tree, if so, replacing the newly moved node by the root of the tree, and updating the mapping index from component to tree; otherwise, forbidding the pre-insertion; if movement to the circulation component and the selection branch component completing the logical function is needed, further updating the mapping index from tree to logical function component; if the moving type is multi-component movement, moving the component of the same connected domain selected by a mouse only; judging whether the component in the connected domain has a bifurcation, if not, using the whole connected domain as one component, with the same moving mode as the single-module movement; and if the component in the connected domain has the bifurcation, moving back at the leaf node of the existing tree only, otherwise the movement being failed; and (k) feeding back a result by the message response module, and wherein the deleting operation comprises following steps:

(l) initiating, by the user, an instruction of deleting a component;

(m) receiving, by the message response module, a message of (l), finding the central controller function for deleting operation, and passing a number of a component to be deleted into the central controller function;

(n) disconnecting the existing connection of the component node to be deleted and deleting the node, if the node to be deleted has a successor node, directly connecting the successor node to a precursor node of the deleted node;

(o) deleting the internal information of the component, if the circulation component and the selection branch component completing the logical function are deleted, further deleting all tree nodes in the component, and corresponding component information and nested logical component, and updating the mapping index; and (p) feeding back a result by the message response module.

9. The graphical programming control and storage system according to claim 1, wherein the persistence module comprises a component initialization sub-module and a user information sub-module; the component initialization sub-module comprises initialization information inside all the components; the user information sub-module reads and compiles inter-component information and intra-component information saved by a user; and dynamic expansion of the graphical programming component is realized by only needing to compile an initialization information persistence document of the newly added component and adding the initialization information persistence document to the component initialization sub-module without recompiling the item.

10. The graphical programming control and storage system according to claim 4, wherein the circulation component contains circulation conditions, circulation times and component tree numbers in the circulation component, which is a root number set of the tree, and meanwhile, a reverse index for numbers of tree to circulation component is provided to improve a query speed, and the circulation component can be nested by the circulation component, a selection branch component or a user-defined component; the selection branch component comprises branch conditions and a plurality of selection branches, each branch comprises a component tree number set in the selection branch component, and meanwhile, the reverse index for numbers of tree to circulation component is provided to improve the query speed, and the selection branch component can be nested by the circulation component, the selection branch component or the user-defined component.

11. The graphical programming control and storage system according to claim 5, wherein the circulation component has and only has one active tree that finally participates in compilation, and a number calculation method of the tree is $I=ID_{module}*ACTIVE\_TREE\_MAP\_FACTOR$, wherein I is an active tree number, $ID_{module}$ is a module number, and ACTIVE_TREE_MAP_FACTOR is 100000; in each branch of the selection branch component, only one active tree finally participates in compilation, and a number calculation method of the tree is $I=ID_{module}*ACTIVE\_TREE\_MAP\_FACTOR+ID_{module}$, wherein I is an active tree number, $ID_{module}$ is a module number, ACTIVE_TREE_MAP_FACTOR is 100000, and $ID_{module}$ is a branch number.

* * * * *